US012478530B2

(12) United States Patent
Lee et al.

(10) Patent No.: US 12,478,530 B2
(45) Date of Patent: Nov. 25, 2025

(54) COMPANION ROBOT TRANSFER ASSISTANT

(71) Applicant: AUTOMATION FOR HUMANITY GLOBAL HOLDINGS SP. Z.O.O., Wroclaw (PL)

(72) Inventors: Ka Shek Neville Lee, Hong Kong (CN); Chi Kit Chan, Hong Kong (CN); Samuel Hui, Hong Kong (CN)

(73) Assignee: AUTOMATION FOR HUMANITY GLOBAL HOLDINGS SP. Z.O.O., Wroclaw (PL)

( * ) Notice: Subject to any disclaimer, the term of this patent is extended or adjusted under 35 U.S.C. 154(b) by 283 days.

(21) Appl. No.: 17/978,087

(22) Filed: Oct. 31, 2022

(65) Prior Publication Data

US 2023/0089983 A1 Mar. 23, 2023

Related U.S. Application Data

(63) Continuation of application No. PCT/CN2021/092996, filed on May 11, 2021.

(60) Provisional application No. 63/022,593, filed on May 11, 2020.

(51) Int. Cl.
*A61G 7/10* (2006.01)

(52) U.S. Cl.
CPC ......... *A61G 7/1028* (2013.01); *A61G 7/1036* (2013.01); *A61G 2200/34* (2013.01)

(58) Field of Classification Search
CPC ............................ A61G 7/1028; A61G 7/1036
See application file for complete search history.

(56) References Cited

FOREIGN PATENT DOCUMENTS

WO WO-2019026144 A1 * 2/2019 ............... A61G 5/14
WO WO-2019174579 A1 * 9/2019 ........... A61G 7/1021

* cited by examiner

*Primary Examiner* — Adam C Ortiz
(74) *Attorney, Agent, or Firm* — JEEN IP LAW, LLC

(57) ABSTRACT

A companion robot transfer assistant for usage alongside an automatic transfer bed and a compatible wheelchair or commode chair includes: means for securing, supporting or grasping the upper body or arms of a patient, means for moving towards or away from a person, and means for sliding or moving laterally from side-to-side; wherein during transfer, the companion robot transfer assistant moves in front of the patient, secures the patient and assists or allows the patient to lean forward resting a portion of their upper body weight on it.

12 Claims, 8 Drawing Sheets

COMPANION ROBOT TRANSFER ASSISTANT

CROSS-REFERENCE TO RELATED APPLICATION

This application claims the benefit of U.S. provisional application No. 63/022,593 filed on May 11, 2020, titled "COMPANION ROBOT TRANSFER ASSISTANT FOR AUTOMATED TRANSFER BED". The entire disclosure of the above-referenced application is incorporated herein by reference in entirety for all purpose.

TECHNICAL FIELD

This application relates to the field of caregiving, and more particularly, to a companion robot transfer assistant for an automated transfer bed.

BACKGROUND

In aged care, health care and home care environments, there is a shortage of almost every kind of resources; especially caregiving labour.

Exasperating this issue is the high number of lifting injuries to front-line caregivers during the transfer and handling of patients who need to be moved back and forth between a bed and an assistive device such as a wheelchair. As a result, many places in the world have passed Safe Patient Lifting laws to give nurses and caregivers the right to demand assistive devices for patient transfer.

However, using existing patient transfer (assistive) devices requires more work to be performed by the nurse. The most typical patient transfer device is a patient lift or mechanical lift/hoist. This sort of transfer equipment requires the use of a harness to first be put on the patient; and this requires extensive assistance, many times by more than one person. Furthermore, the patient lift requires a caregiver's assistance to use as it needs to be brought over to the patient and then the intended destination, which many times could be a wheelchair.

For these reasons, prior art assistive devices are not suitable to be used independently by paraplegics or those with limited mobility but still retain some upper body or core strength.

SUMMARY

One example embodiment provides a companion robot transfer assistant for usage alongside an automatic transfer bed and a compatible wheelchair or commode chair, the companion robot transfer assistant includes:

means for securing, supporting or grasping the upper body or arms of a patient, means for moving towards or away from a person, and means for sliding or moving laterally from side-to-side;

wherein during transfer, the companion robot transfer assistant moves in front of the patient, secures the patient and assists or allows the patient to lean forward resting a portion of their upper body weight on it.

BRIEF DESCRIPTION OF THE DRAWINGS

The present application will now be described, by way of example, with reference to the accompanying drawings, in which.

DETAILED DESCRIPTION

In PCT/CN2019/077860 and PCT/CN2019/119519, the concept of an interleaf cushion system for transferring a patient laterally to a specialized wheelchair is introduced. While this system works in ideal situations, there are a few shortcomings.

The first is that the patient is not secure during the transfer process and a shift of position during transfer could potentially be dangerous. The second is that having a linear actuator behind the back of the user would unnecessarily result in a thick and complicated backrest for the wheelchair or shower chair making it less than optimal for bathing purposes. Not only would the resulting wheelchair or shower chair be more complicated but the thickness of the backrest would unnecessarily block more shower water due to needing to shoot through a thicker or longer passageway through the backrest to reach the patient's body. The third is that slight shifts in the position of the patient could result in unsuccessful transfer.

Figure 1A:
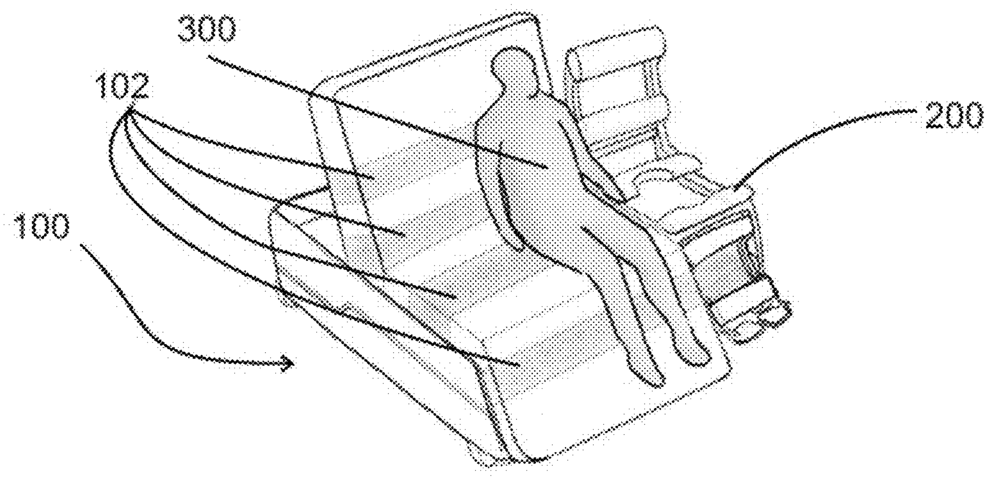
FIGS. 1*a* to 1*c* are schematic diagrams showing an interleaf cushion system for transferring a patient according to an embodiment of the prior art.
Figure 1B:
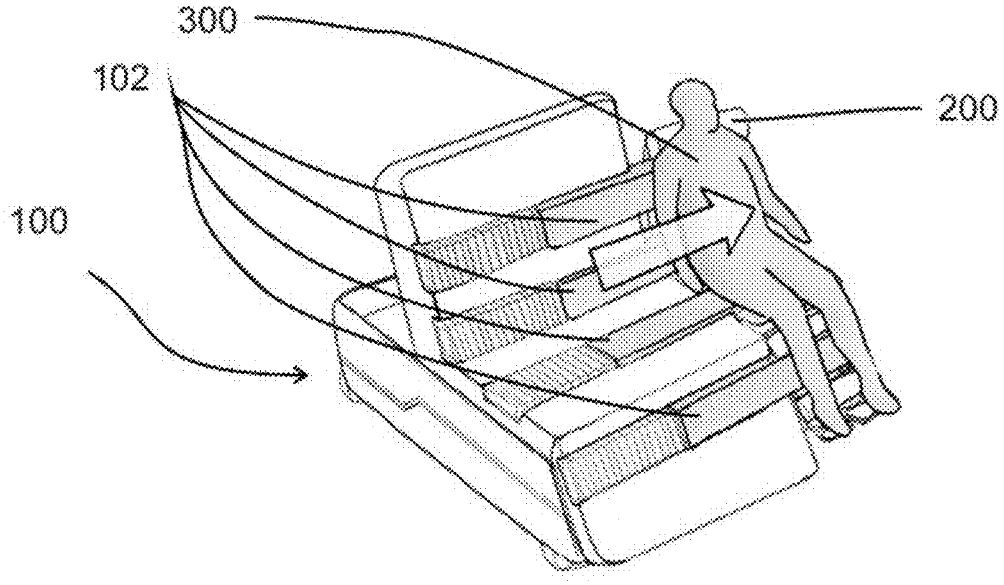
Figure 1C:
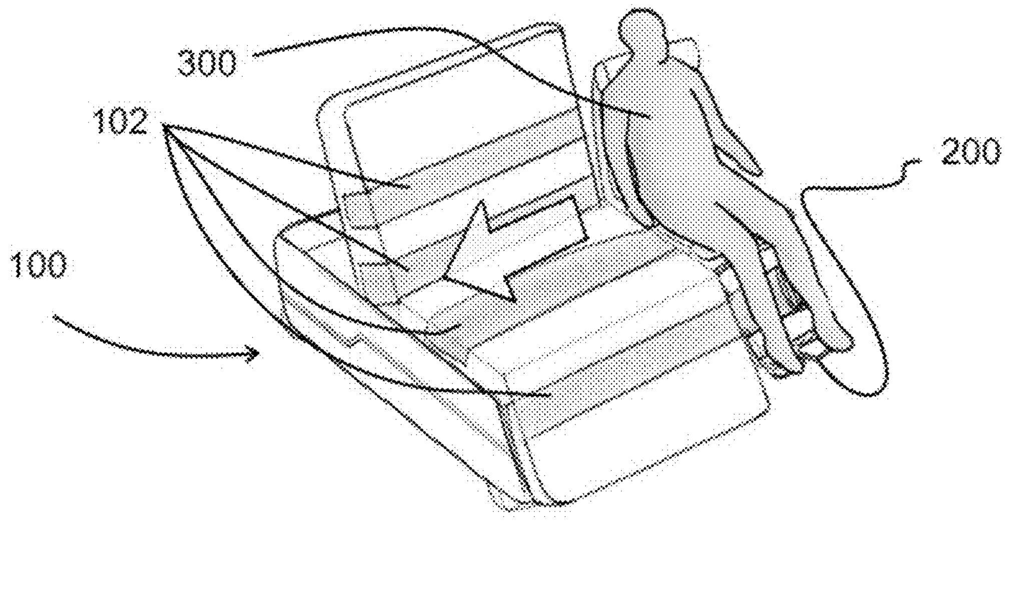

For example, FIGS. 1*a* to 1*c* depict an embodiment of the prior art introduced in PCT/CN2019/119519. FIG. 1*a* shows an automatic transfer bed 100 adapted into a sitting position with a compatible mobile shower commode 200 and patient 300 sitting on the automatic transfer bed 100. Suspended sliders 102 are raised or inflated to lift the patient 300 above a regular surface of the bed 100. The patient 300 is then transferred laterally towards the mobile shower commode 200 where the patient is placed down by the lowering or deflation of the suspended sliders 102 and the suspended sliders 102 are retracted back to the bed 100.

As mentioned above, movement from the patient during or prior to transfer could potentially interfere with the performance or success of the transfer. Moreover, the patient is at risk of falling if they cannot maintain regular sitting balance. Plus, since the suspended slider 102 must have room to expand and shrink the back of the mobile shower commode 200 will need to be abnormally thick thus partially interfering with its usage in the shower.

Thus, the intention of this application is to introduce a companion robot transfer assistant to combat at least one of these aforementioned shortcomings as well as reduce pressure injuries by helping to shift weight. The companion robot transfer assistant combines with the automatic transfer bed 100 and the compatible mobile shower commode 200 to better transfer a patient 300 between the two devices, which can make the transfer process safer, better for bathing and more robust to account for shifts in position.

Furthermore, it is anticipated that the companion robot transfer assistant would be useful for repositioning the user and shifting their body weight to accomplish additional care tasks in the future. Shifting body weight can be useful for improving blood circulation and preventing sore spots.

The companion robot transfer assistant involved in the present application is for usage alongside an automatic transfer bed and compatible wheelchair or commode chair with means for securing the upper body or arms of a patient and which can move towards or away from a person as well as sliding laterally from side to side.

During transfer, the companion robot transfer assistant moves in front of the patient, secures the patient and assists or allows the patient to lean forward resting a portion of their upper body weight on it.

The companion robot transfer assistant can then synchronize its lateral movement with a slider on the automatic transfer bed to transfer a patient to and from a compatible wheelchair or commode chair.

Figure 2A:
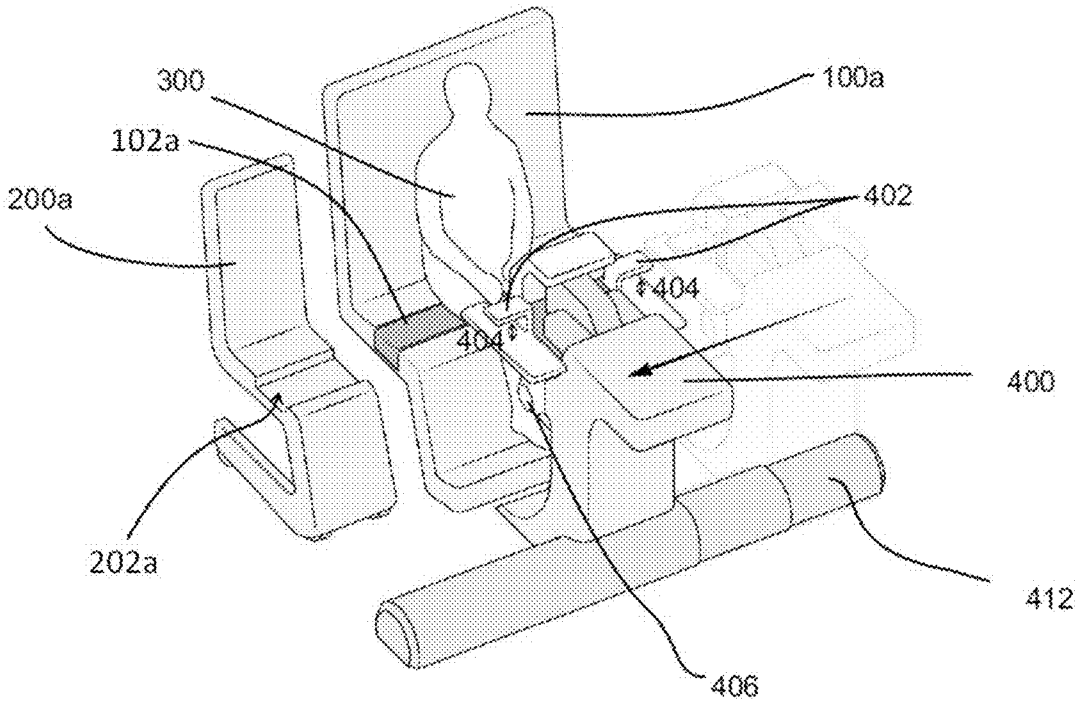
FIGS. 2*a* to 2*e* are schematic diagrams showing a companion robot transfer assistant assisting in transferring a patient between an automatic transfer bed and a compatible mobile shower commode according to an embodiment of the present application.
Figure 2B:
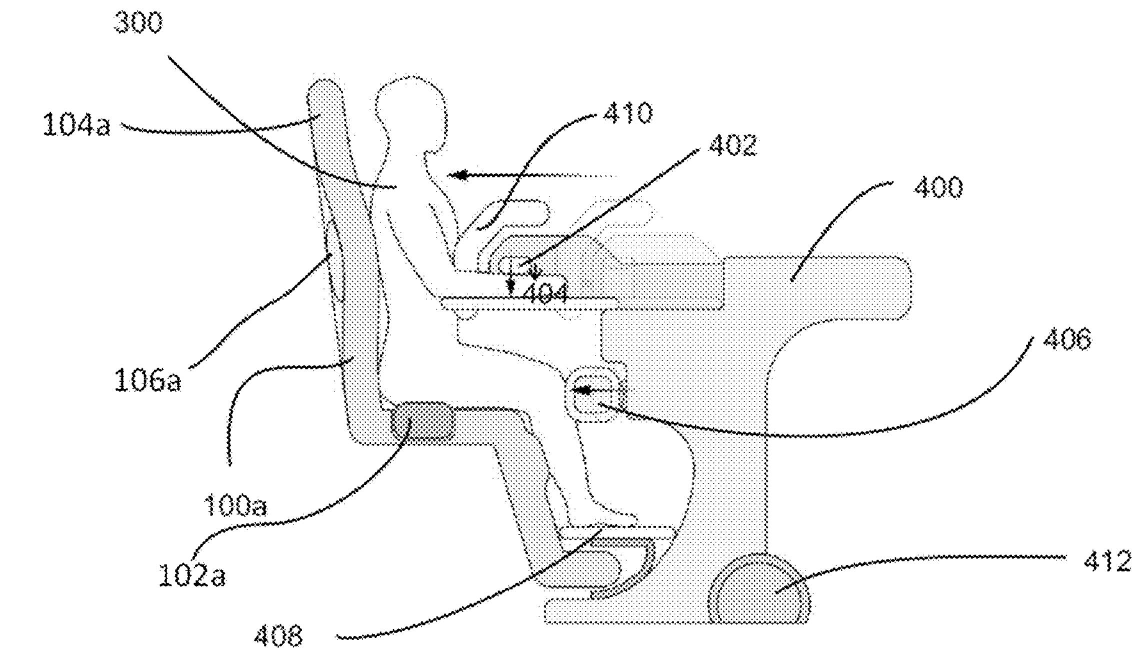

FIGS. 2*a* to 2*e* depict a first embodiment of the new invention. In FIG. 2*a* there is a reclinable automatic transfer bed 100*a* similar to the ones in FIG. 1*a* to 1*c* except that preferably it has fewer suspended sliders 102*a*. This is preferable because it reduces the complexity of the compatible mobile shower commode 200*a* which also needs to accommodate less sliders 102*a* and thus the backrest 104*a* can be thinner. At the foot of the bed 100*a*, there is a companion robot transfer assistant 400 that optionally can be stored at the side or end of the bed 100*a* when not in use.

To prepare for transfer, the companion robot transfer assistant (CRTA) 400 can slide out from a side of the bed 100*a* to locate the front of the patient 300. When the CRTA 400 successfully locates the patient 300, the CRTA or a portion of it moves towards the patient 300 thus decreasing the amount of open space as in FIG. 2*b*. The CRTA 400 includes means to secure the upper body or arms of the patient 300 and/or a central chest support 410 to rest the weight of the patient 300' upper body.

Preferably, such securing means includes means to hold the arms of the patient 300 when the patient 300 lifts his arms and inserts them in arm graspers 402. Optionally arm grasper 402 grabs onto the arm of the patient 300 either with an air bag or other mechanical means as in FIG. 2*b* where a decrease in the cavity space 404 of the arm grasper 402 locks the patient's 300 arms.

Preferably, there is also means to prevent the lower body from sliding down or forward which could interfere with the CRTA's 400 aim of having weight transferred to it. Optionally such preventative sliding means consists of means to restrict the movement of the legs or feet, which can act by itself or with assistance from the automatic transfer bed. One such possibility is a leg locking cushion 406 to lock the movement of the legs. Another possibility is a foot platform 408 that can be help support the bottom of the patient's 300 foot to prevent sliding.

Figure 2C:
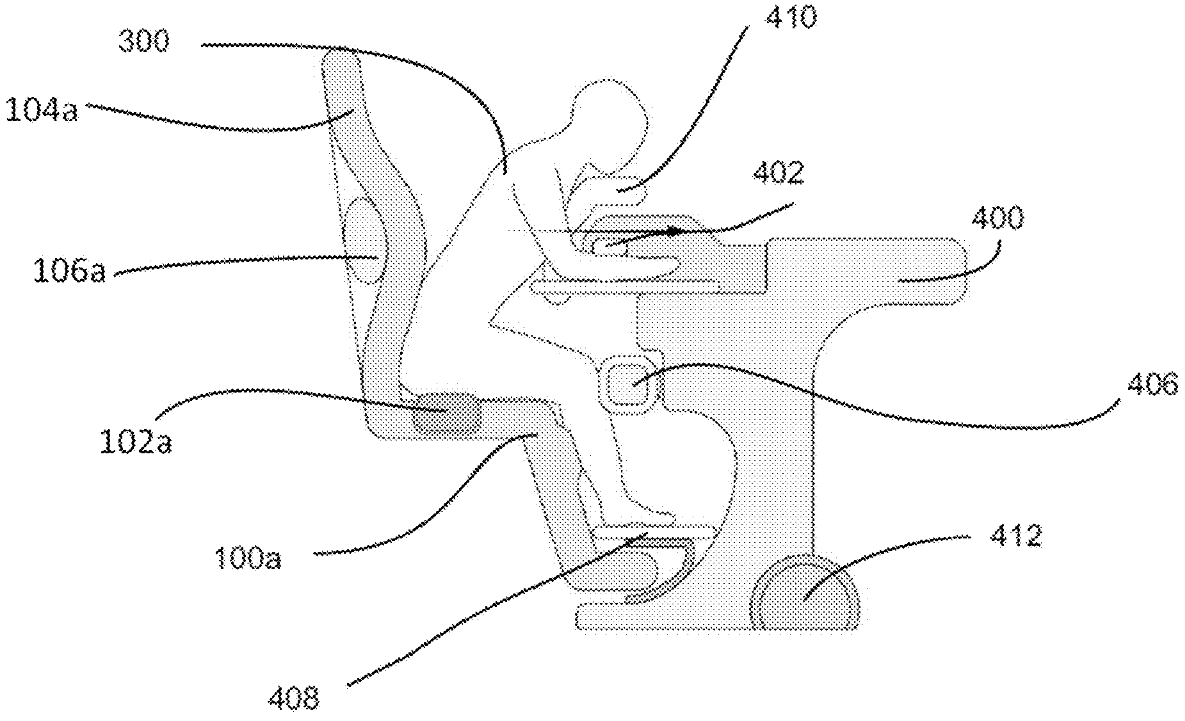

In FIG. 2*c*, much of the upper body weight of the patient 300 is transferred to the CRTA 400 by the simultaneous push from a pushing means 106*a*, a pulling away of the CRTA 400 which is grasping the arms of the patient 300 through the arm graspers 402 and the means to restrict movement of the legs or feet. Preferably the pushing means 106*a* includes an air bag.

Figure 2D:
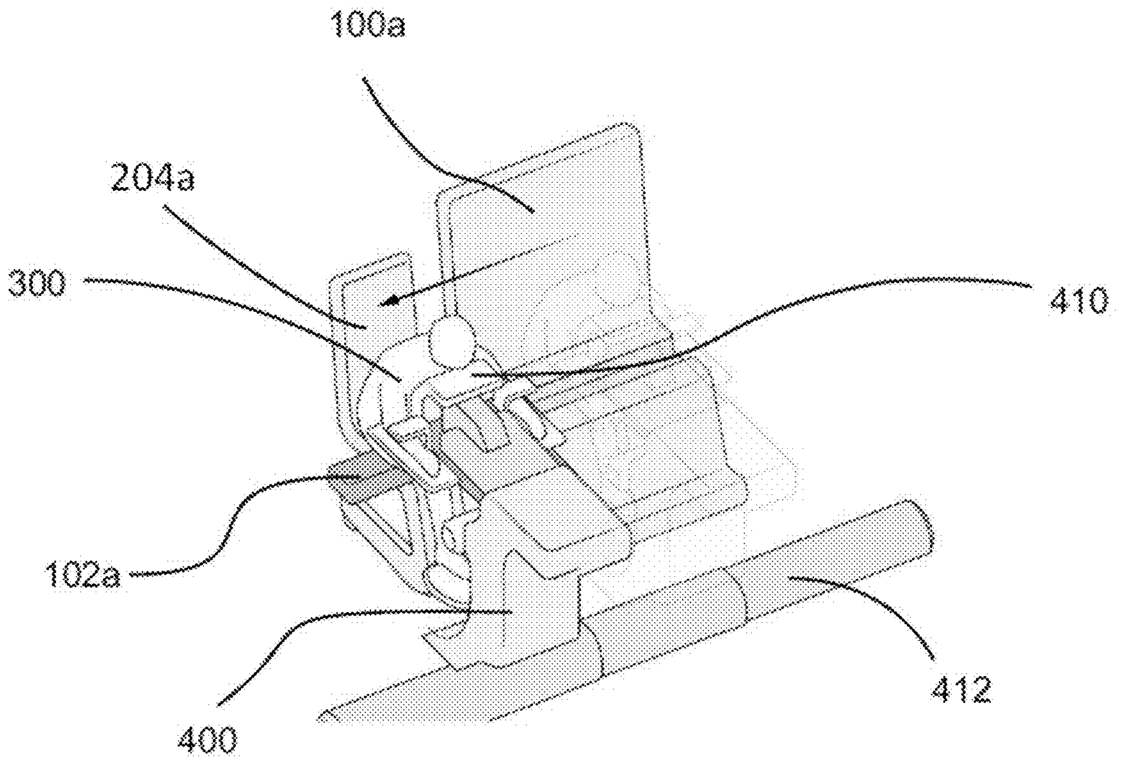

Then in FIG. 2*d*, a raising or expansion of a cushion on a slider 102*a* and subsequent lateral movement timed or synchronized with the lateral movement of the CRTA 400 can help bring the patient 300 over to the compatible mobile shower commode 200*a*. Preferably the CRTA 400 slides, is guided by or moves along a track 412. More preferably the CRTA 400 includes wheels for movement (not shown).

Upon reaching the shower commode 200*a*, the CRTA 400 can preferably help push the patient 300 back upright so they lean against the backrest 204*a* of the compatible mobile shower commode 200*a* through the movement of CRTA 400 towards the user and the pushing of the central chest support 410 or other pushing means.

To release the patient 300, the arm graspers 402 can release the arms of the patient 300 while leg locking cushion 406 and foot platform 408 can also move away from the user.

Figure 2E:
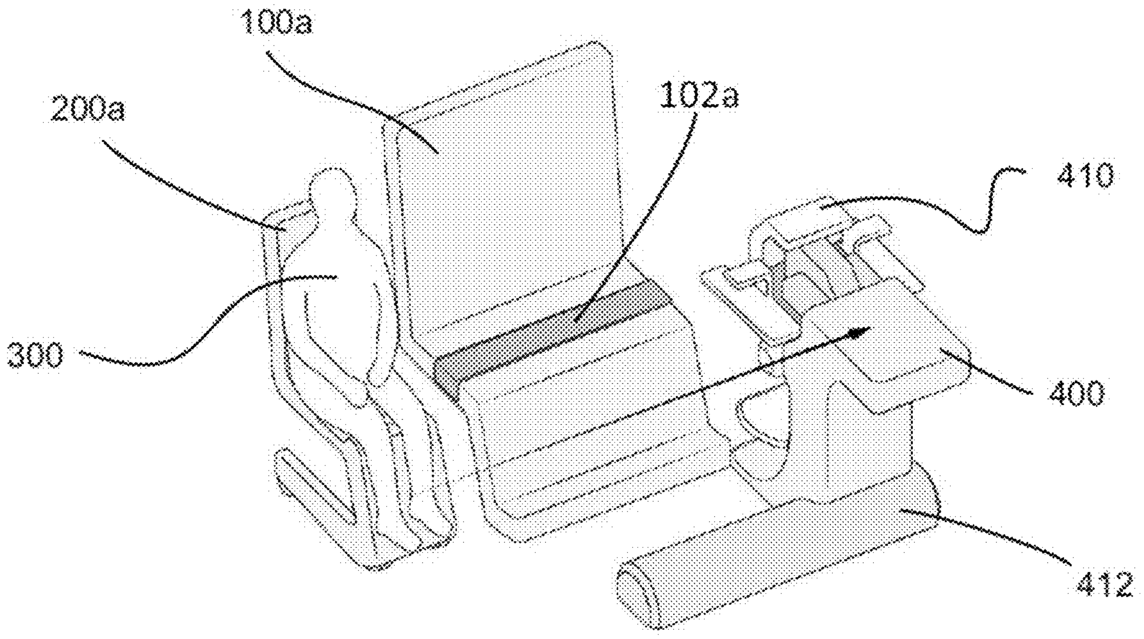

Finally, the cushion on a slider 102*a* can deflate or lower itself and the CRTA 400 can move away from the user and can move back to the bed along with the cushion on a slider 102*a* as in FIGS. 2*d* and 2*e*.

To transfer a patient 300 back to the bed 100*a* the reverse process is initiated. The cushion on the slider 102*a* extends again into the channel 202*a* on the compatible mobile shower commode 200*a*. Simultaneously the CRTA 400 moves in front of the patient 300. The CRTA 400 moves towards the patient 300, the patient 300 locks his arms in the arm graspers 402 and is pulled forward by the CRTA 400 while a back pusher on the shower commode 200*a* pushes the back and preferably some leg locking cushion 406 and foot platform 408 prevents the person from sliding down. Retracting of the cushion on the slider 102*a* and the CRTA 400 moves the patient 300 to the bed 100*a* where the CRTA 400 can push the patient 300 back upright.

A second embodiment of the new invention is shown in FIGS. 3*a* to 3*g* that is similar to those in FIGS. 2*a* to 2*e* except that there is a body hugger 402*a* rather than arm grasper 402.

To prepare for transfer, the companion robot transfer assistant (CRTA) 400*a* can slide out from a side of the bed 100*a* to locate the front of the patient 300. When the CRTA 400*a* successfully locates the patient 300, the CRTA 400*a* or a portion of it moves towards the patient 300 thus decreasing the amount of open space as in FIG. 3*b*. The CRTA 400*a* includes means to secure the upper body of the patient 300 and/or a central chest support 410 to rest the weight of the patient 300' upper body.

Figure 3A:
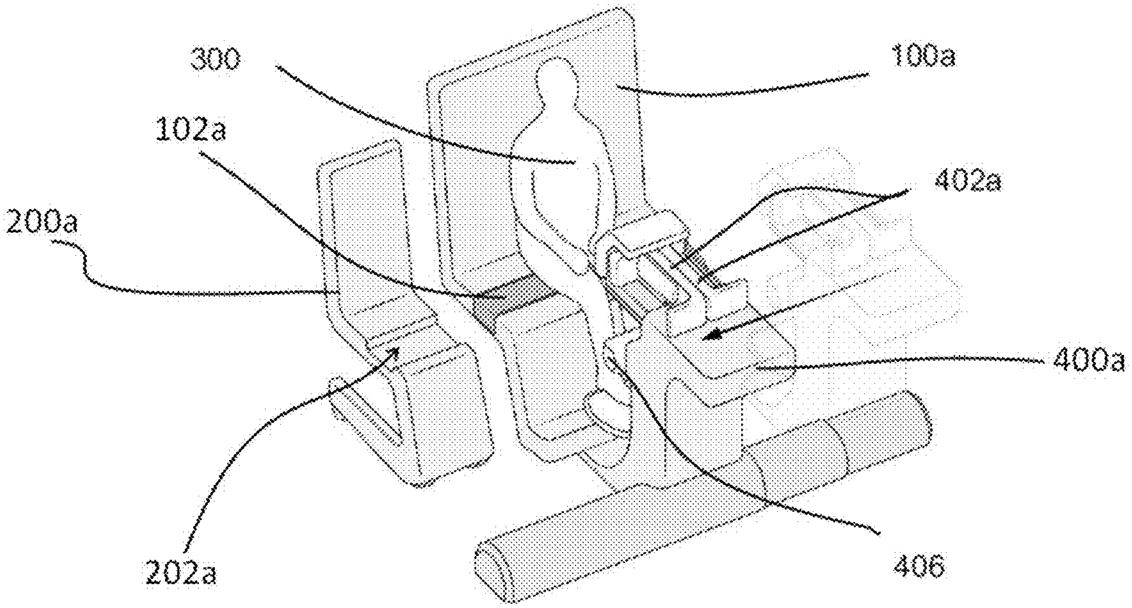
FIGS. 3*a* to 3*g* are schematic diagrams showing a companion robot transfer assistant assisting in transferring a patient between an automatic transfer bed and a compatible mobile shower commode according to another embodiment of the present application.
Figure 3B:
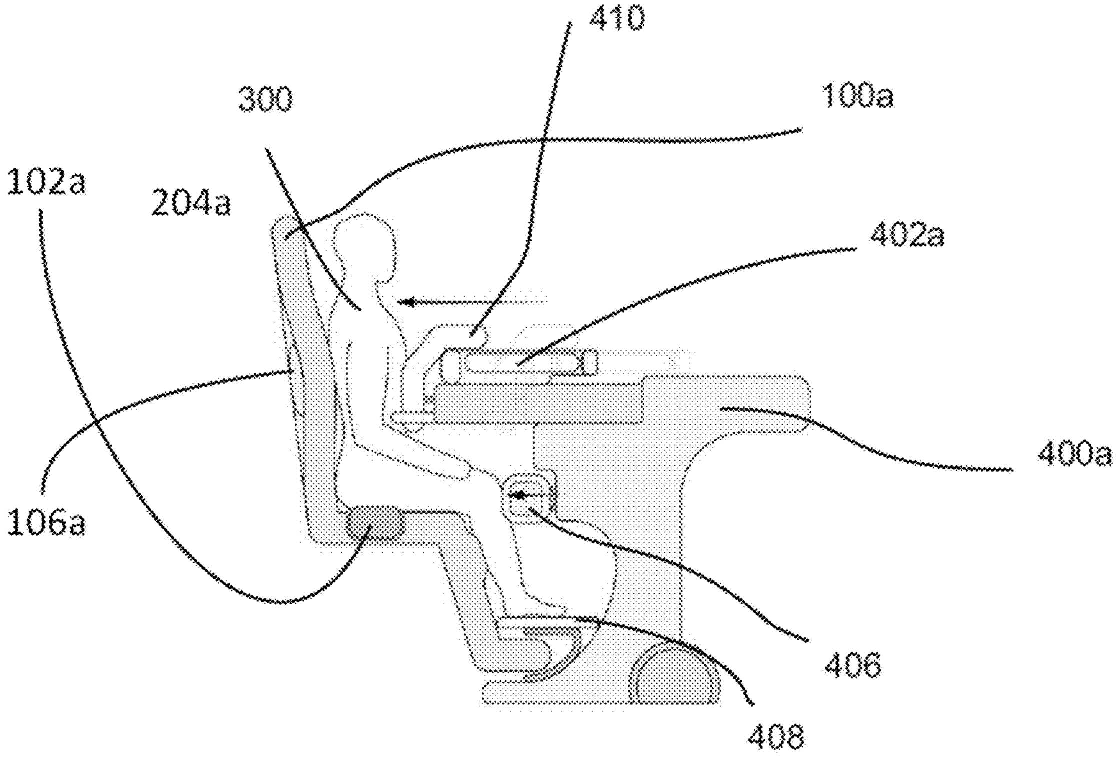
Figure 3C:
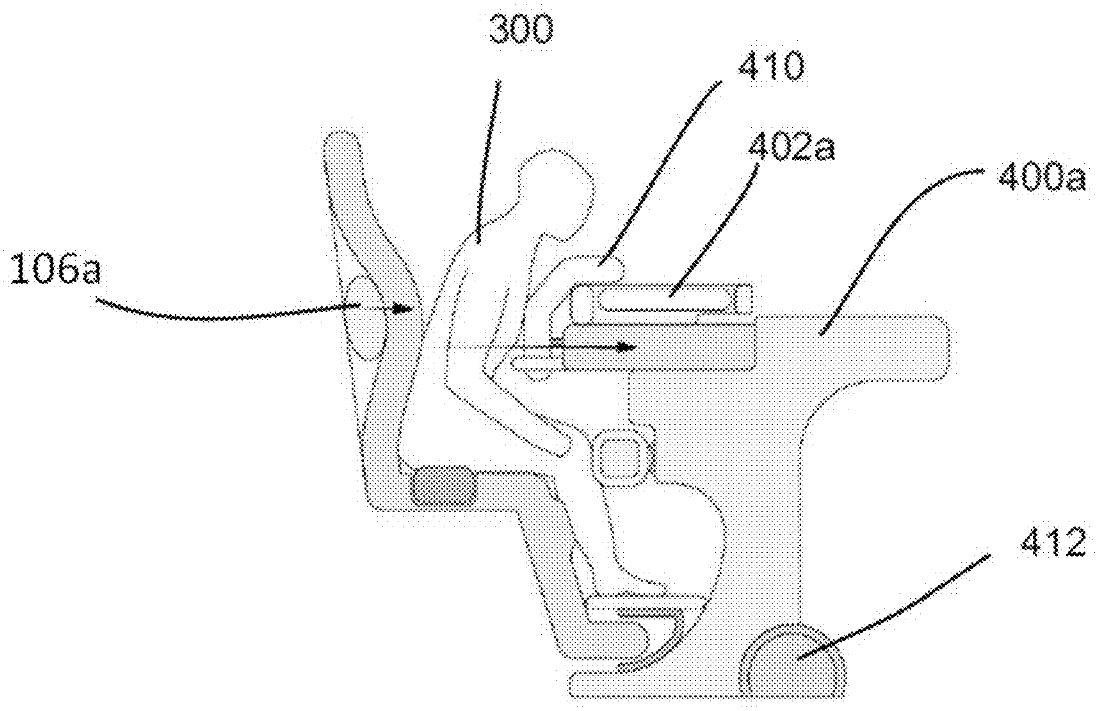
Figure 3D:
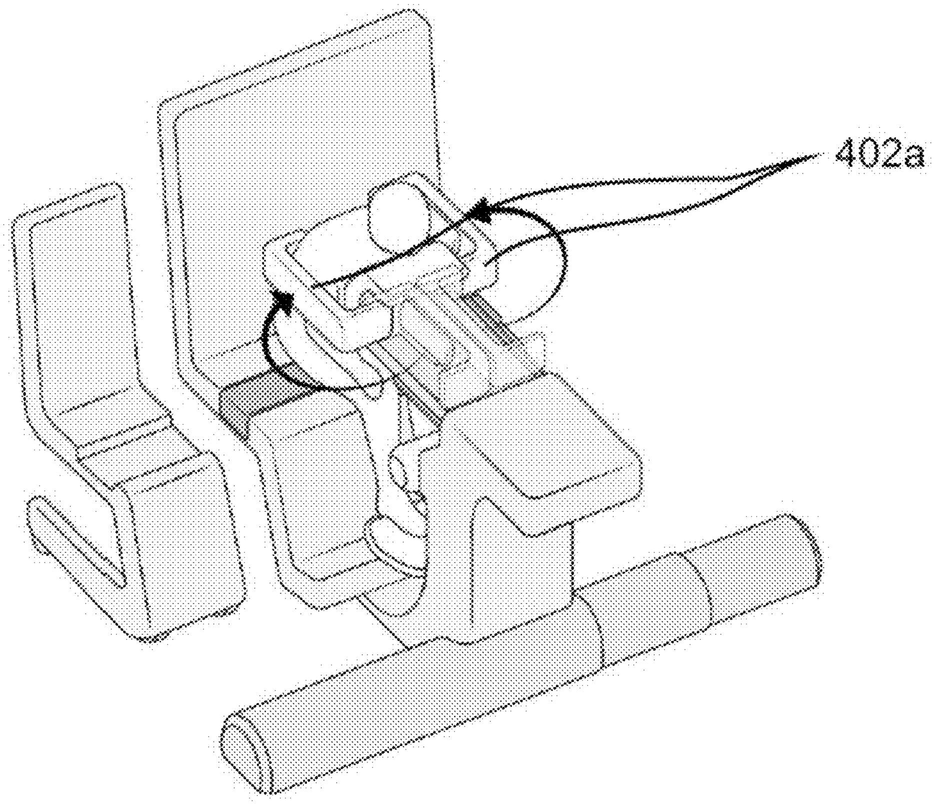
Figure 3E:
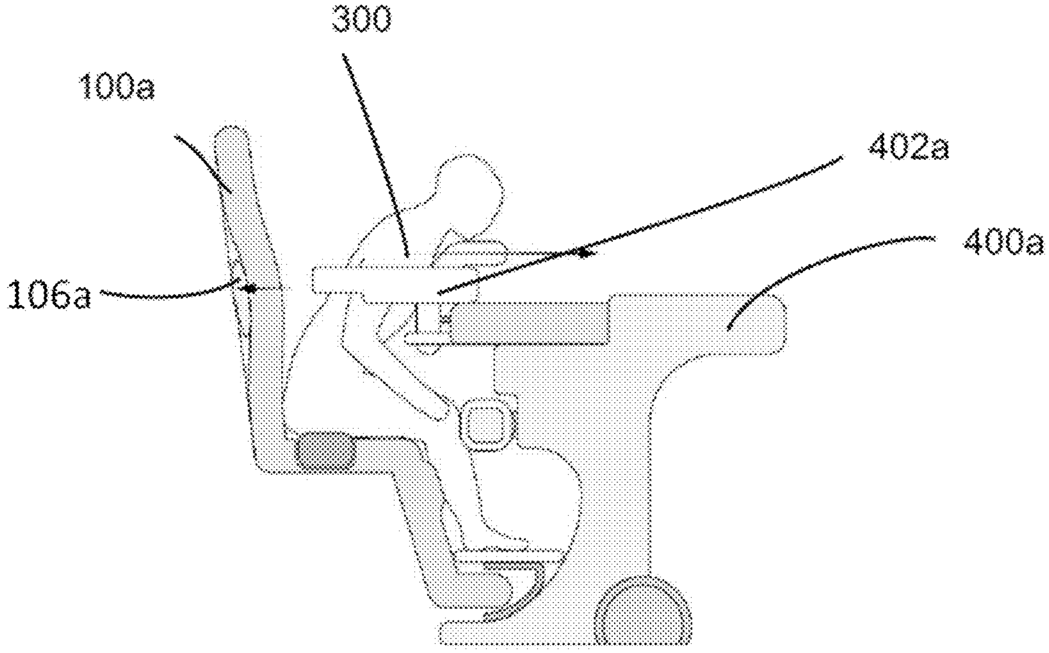

As in FIG. 3*c*, expansion of a cushion or pushing by a pushing means 106*a* preferably helped by leg restrictors 406 and foot support 408 causes the patient 300 to lean forward on to the central chest support 410. In FIG. 3*d*, the body hugger 402*a* can enclose or hug the patient 300 who is leaning forward. As in FIG. 3*e*, when the CRTA 400*a* moves away from the bed, the patient 300 is pulled forward.

Figure 3F:
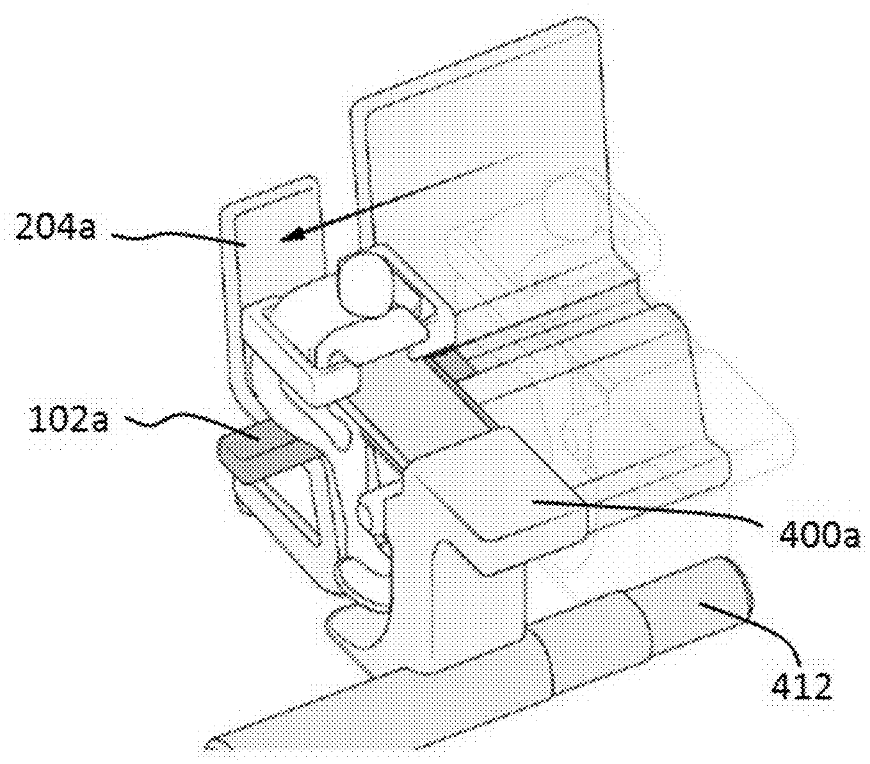
Figure 3G:
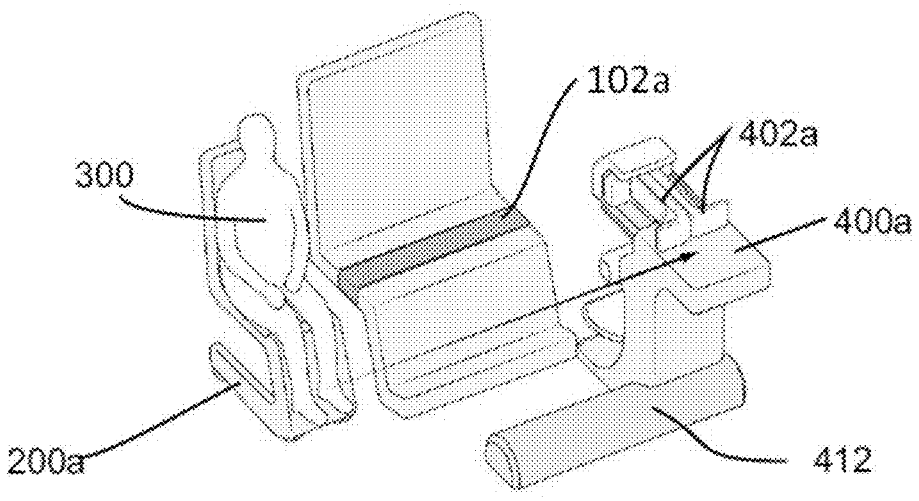

Then in FIG. 3*f*, a raising or expansion of the cushion on the slider 102*a* and subsequent lateral movement of slider 102*a* timed with the lateral movement of the CRTA 400*a* can help bring the patient 300 over to the compatible mobile shower commode 200*a*. Preferably the CRTA 400*a* slides, is guided by or moves along a track 412. More preferably the CRTA 400*a* includes wheels for movement (not shown).

Upon reaching the shower commode 200*a*, the CRTA 400*a* can preferably help push the patient 300 back upright so they lean against the backrest 204*a* of the compatible mobile shower commode 200*a* through the movement of CRTA 400*a* towards the user and the pushing of the central chest support 410 or other pushing means.

The body hugger 402*a* can release the patient 300, the CRTA 400*a* can pull away. Then the cushion 102*a* can deflate or be lowered and both the CRTA 400*a* and cushion 102*a* can be retracted back to the bed 100*a*. As in the second embodiment, the patient 300 is thus safely transferred from a bed to a wheelchair.

The invention claimed is:

1. A system, comprising a companion robot transfer assistant for usage alongside an automatic transfer bed and a compatible wheelchair or commode chair; wherein the companion robot transfer assistant comprises: a. an arm grasper for grasping an arms of a patient or a body hugger for grasping an upper body of a patient; b. a leg locking cushion and foot platform for securing a lower body and prevent sliding of a patient c. a central chest support for receiving an upper body of a patient d. a track for guiding the movement of the companion robot transfer assistant between the automatic transfer bed and a compatible wheelchair or commode chair; wherein the automatic transfer bed comprises of a cushion on a slider for sliding or moving laterally from side-to-side to support a patient's buttocks or thighs; wherein during transfer, the companion robot transfer assistant moves in front of the patient along the track, secures the patient and assists or allows the patient to lean forward resting a portion of their upper body weight on it; wherein said automatic transfer bed comprises a pushing means for pushing a back of a patient, and the pushing means is set in a backrest of the automatic transfer bed.

2. The system as claimed in claim 1, further comprising means for synchronizing its lateral movement with the slider on the automatic transfer bed.

3. The system claimed in claim 1, wherein the central chest support can help push the patient backwards and upright.

4. The system as claimed in claim 1, further comprising means for preventing sliding frontwards or backwards either by itself or with assistance from the automatic transfer bed.

5. The system as claimed in claim 1, wherein the arm grasper secures or grasps the arms of a patient by decreasing the cavity space of the arm grasper with an air bag or other mechanical means.

6. The system as claimed in claim 1, wherein said means for pushing the back of a patient comprises an air cushion that can expand or contract.

7. The system as claimed in claim 1, wherein said compatible wheelchair or commode chair comprises means for pushing the back of a patient.

8. The system as claimed in claim 7, wherein said means for pushing the back of a patient comprises an air cushion that can expand or contract.

9. The system as claimed in claim 1, whereupon transfer from said automatic transfer bed to said compatible wheelchair or a shower commode, a cushion on a slider of said automatic transfer bed is raised or inflated, the patient is leaning forward on the companion robot transfer assistant, and both the slider and the companion robot transfer assistant move laterally simultaneously towards said compatible wheelchair or shower commode at its side.

10. The system as claimed in claim 9, whereupon transfer from said compatible wheelchair or shower commode to said automatic transfer bed, the cushion on the slider of said automatic transfer bed extends into a channel on said compatible wheelchair or shower commode, the patient is leaning forward on the companion robot transfer assistant again, and both the slider and the companion robot transfer assistant move laterally simultaneously towards said automatic transfer bed at its side.

11. The system as claimed in claim 1, wherein the companion robot transfer assistant moves towards the person or patient from the front.

12. The system as claimed in claim 1, wherein body hugger secures or grasps the upper body of a patient by rotating towards the upper body of the patient to hug the upper body.

* * * * *